US008879871B2

United States Patent
Vadon et al.

(10) Patent No.: US 8,879,871 B2
(45) Date of Patent: Nov. 4, 2014

(54) METHOD FOR PROCESSING IMAGES USING AUTOMATIC GEOREFERENCING OF IMAGES DERIVED FROM A PAIR OF IMAGES CAPTURED IN THE SAME FOCAL PLANE

(75) Inventors: Hélène Vadon, Toulouse (FR); Christophe Latry, Toulouse (FR)

(73) Assignee: Centre National d'Etudes Spatiales (FR)

( * ) Notice: Subject to any disclaimer, the term of this patent is extended or adjusted under 35 U.S.C. 154(b) by 1885 days.

(21) Appl. No.: 11/793,480

(22) PCT Filed: Dec. 16, 2005

(86) PCT No.: PCT/EP2005/056852
§ 371 (c)(1),
(2), (4) Date: Jun. 15, 2007

(87) PCT Pub. No.: WO2006/064051
PCT Pub. Date: Jun. 22, 2006

(65) Prior Publication Data
US 2008/0089558 A1    Apr. 17, 2008

(30) Foreign Application Priority Data
Dec. 16, 2004  (FR) ..................................... 04 13420

(51) Int. Cl.
*G06K 9/36* (2006.01)
*G06T 17/05* (2011.01)
*G01C 11/06* (2006.01)

(52) U.S. Cl.
CPC .............. *G06T 17/05* (2013.01); *G01C 11/06* (2013.01)
USPC ........... 382/285; 382/289; 382/294; 382/100; 382/154; 348/144; 348/147; 345/629

(58) Field of Classification Search
USPC .......... 382/285, 289, 294, 154; 348/144, 147; 353/6
See application file for complete search history.

(56) References Cited

U.S. PATENT DOCUMENTS 6,064,760 A  *  5/2000  Brown .......................... 382/154
6,320,611 B1 * 11/2001  Pepin ............................ 348/147

(Continued)

OTHER PUBLICATIONS

Ehlers et al., "Stereocorrelation of Landsat TM Images", Photogrammetric Engineering and Remote Sensing, vol. 53, No. 9, pp. 1231-1237, Sep. 1987.

(Continued)

*Primary Examiner* — Matthew Bella
*Assistant Examiner* — Julian Brooks
(74) *Attorney, Agent, or Firm* — Lerner, David, Littenberg, Krumholz & Mentlik, LLP (57) ABSTRACT

An image processing system in which the georeferencing of at least one digital image is achieved by means of at least one picture model of the said digital image and of a digital reference relief form. The digital image is obtained from a pair of digital images acquired in the same focal plane. An intermediate digital relief form is produced from said pair of digital images. The intermediate digital relief form and said digital reference relief form are processed to refine the said picture model of the said digital image to be georeferenced. A final digital relief form is generated and said final digital relief form and said digital image are projected in a geographical or cartographic system, for the purpose of their georeferencing. The pair of digital images in the same focal plane are acquired in a small stereoscopic base configuration by sensors located in the same focal plane.

15 Claims, 7 Drawing Sheets

(56) References Cited

U.S. PATENT DOCUMENTS

| | | | |
|---|---|---|---|
| 6,396,946 B1* | 5/2002 | Sogawa | 382/154 |
| 6,694,064 B1* | 2/2004 | Benkelman | 382/284 |
| 6,757,445 B1 | 6/2004 | Knopp | |
| 7,283,658 B2* | 10/2007 | Maruya | 382/144 |
| 7,751,651 B2* | 7/2010 | Oldroyd | 382/294 |
| 2005/0031197 A1* | 2/2005 | Knopp | 382/154 |
| 2005/0073532 A1* | 4/2005 | Scott et al. | 345/634 |
| 2005/0220363 A1* | 10/2005 | Oldroyd | 382/294 |
| 2005/0283294 A1* | 12/2005 | Lehman et al. | 701/50 |
| 2006/0041375 A1* | 2/2006 | Witmer et al. | 701/208 |
| 2006/0215935 A1* | 9/2006 | Oldroyd | 382/294 |
| 2006/0239537 A1* | 10/2006 | Shragai et al. | 382/154 |

OTHER PUBLICATIONS

Iikura, "Automation of Precise Ortho-rectification of Landsat TM Images", SICE 2002, Proceedings of the 41st SICE Annual Conference, vol. 3, pp. 1898-1900, Aug. 5, 2002.

* cited by examiner

FIG_1

FIG_7

METHOD FOR PROCESSING IMAGES USING AUTOMATIC GEOREFERENCING OF IMAGES DERIVED FROM A PAIR OF IMAGES CAPTURED IN THE SAME FOCAL PLANE

CROSS REFERENCE TO RELATED APPLICATIONS

The present application is a national stage application under 35 U.S.C. §371 of International Application No. PCT/EP 2005/056852, filed Dec. 16, 2005, which claims priority from French Application No. 0413420, filed Dec. 16, 2004.

BACKGROUND OF THE INVENTION

1. Field of the Invention

The field of the invention is that of remote image acquisition, and in particular the acquisition of images transmitted terrestrially or by satellite. More precisely, the invention concerns a method for automatically georeferencing the remote acquisition of images, meaning that the invention concerns a method that is used to automatically associate, with the elements for the remote acquisition of images, a position that is determined by geographical or cartographic coordinates.

2. Description of the Prior Art

A remotely-acquired image supplies a three-dimensional, spatially-sampled representation of a region on the ground called a scene. This is a representation in which each digital remotely-acquired image is representative of a small area on the ground, centred on each of the points of the sampling grid.

The majority of remotely-acquired imagery applications necessitate a method called georeferencing, which establishes a geometrical relationship between the coordinates in the image geometry, defined by a line number and a column number, and the geographical or cartographic coordinates on the ground.

The correspondence between the line and column image coordinates and the ground coordinates, which are expressed in terms of latitude and longitude in the geographical coordinate system and in meters in the projection cartographic system, is determined by calculating the intersection of the direction of view of the detectors making up the sensor of the imaging system that acquires the images, at the moment of acquisition, using a model of the Earth.

This calculation then requires two categories of information.

The first information category concerns knowledge of the geometry of the picture. This is determined by the characteristics of the sensor (instrument characteristics), the position, the speed and the attitude of the carrier, where the latter are the angles of roll, pitch and yaw. The picture geometry is known to the user through a geometrical model, created by means of geometrical sampling, and delivered in general with the images. This model is always of limited precision, through lack of sampling of the focal plane, and because of sampling and filtering of the attitude data.

The second information category concerns knowledge of an altitude model of the Earth. The latter can be approximated by an ellipsoid or by an altitude model of the region in which the scene is located, and more particularly a digital terrain model (DTM). This is defined as a digital representation of altitude that includes the gradient and relief parameters of the geographical region under study.

Being in possession of such information with any degree of precision is rather unusual in practice. The raw images obtained by a sensor cannot be georeferenced directly in a precise manner, since they include global or local deformations that are not modelled perfectly. One could mention, for example, the deformations due to imperfect knowledge of the picture optics, to unknown movements of the imaging system, and to inaccuracies in one's knowledge of the relief in the observed zone.

When it is desired to geometrically correct and georeference a remotely-acquired image, it is then necessary to call upon additional information that can chiefly be either knowledge of a certain number of points called control points, or knowledge of other remote image acquisitions that have already been georeferenced.

The first known technique employed to correct and georeference a remotely-acquired image is therefore dependent upon the search for control points, that is for known locating points in terms of coordinates, and which are identifiable both in the image and on the ground. With knowledge of the local relief (from the DTM) where available, these points are used to refine the geometrical picture model of the remotely-acquired image, which then allows its projection on the ground and enables it to be georeferenced.

The projection on the ground increases in precision with the number of control points available and with the evenness of their distribution in the image.

The control point selection procedure generally makes use of points that are well-defined and precise, such as road intersections, buildings, corners of fields, etc.

In most cases, selection is effected from a map. When no map is available, or its precision is inadequate, then one has to resort to finding control points by conventional geodesic methods or by use of the global positioning system (GPS).

The selection of control points is thus partially or totally manual. This is a lengthy and costly operation that calls for very experienced operators and a great deal of care in order to avoid the introduction of errors into the georeferencing process.

The second known, technique to correct and georeference a remotely-acquired image, and which is used in order to circumvent the manual process, relies on the use of a certain number of thumbnail images, which are extracted from images that have already been georeferenced.

In this case, the search for control points is replaced by the search for validated points between the image to be georeferenced and the already georeferenced thumbnail image, which has the advantage of allowing the georeferencing procedure to be automated.

Now this technique assumes that one is in possession of a database of images or of thumbnail images that cover a large part of the surface of the Earth, and that this base is available for most of the users of image processing. At the present time, such a database, if any, is not freely accessible.

In addition, the constitution of such a database is a complex and extremely expensive operation.

Moreover, if use is made of such a reference base, then the large seasonal variations of the images give rise to a lack of temporal correlation that complicates the search for validated points between the image to be georeferenced and the reference image.

One object of this present invention is to propose an image processing system that achieves the georeferencing of images and that also differs from the previous techniques and their drawbacks, in particular in that it allows a fully automatic georeferencing of images that does not depend upon on a database of images or on thumbnail images that have already been georeferenced.

Another object of the invention is to provide a method for the georeferencing of images that is entirely automatic, from an image pair acquired either by CCD (charge-coupled device) sensors, or by TDI (time delay integration) matrices, with resolutions and spectral bandwidths that may be different, belonging to the same focal plane and therefore arranged in a configuration with a small stereoscopic base.

The stereoscopic coefficient, b/h, for each point on the ground, is the ratio between the distance, b, between the two points in the space that have imaged this point on the ground, and the distance, h, between these points in the space and the point in the observed scene. A small stereoscopic base configuration is defined as a stereoscopic ratio, b/h, that is typically less than 0.3.

Figure 1:
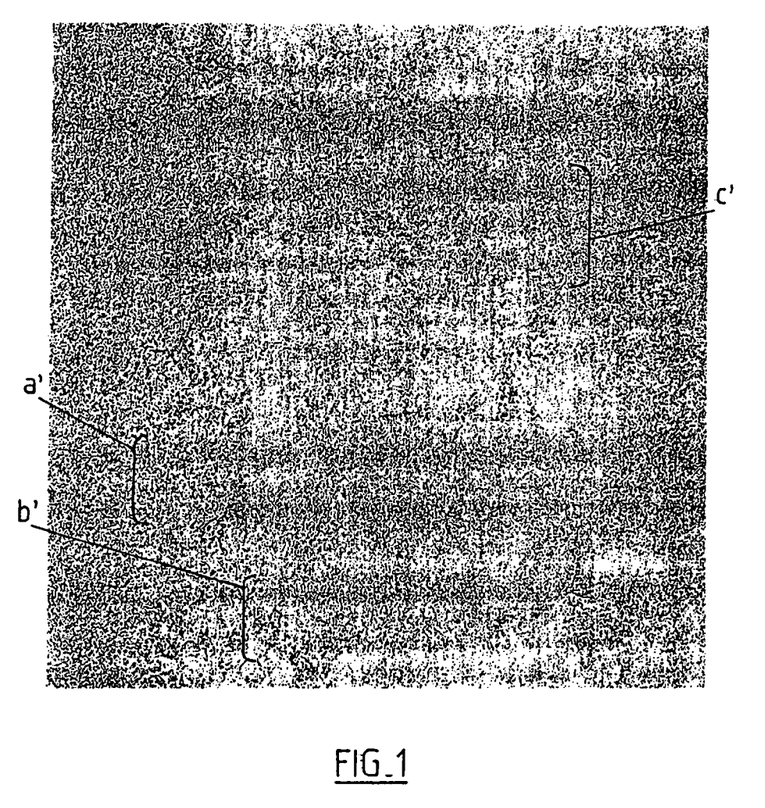
FIG. 1 illustrates attitude residues that are conventionally present in a model of the DTM type with a small stereoscopic base.

Another object of this present invention is to overcome, in the georeferencing process, the image artifacts that are characteristic of stereoscopy at low b/h, namely the residues arising from unmodelled attitude vibrations. Attitude residues can be seen in FIG. 1, and are indicated schematically by waves along the columns, causing the appearance alternately of sets of light and dark lines such as sets a', b', and c'. If they were not eliminated, these attitude artifacts would be interpreted as alternately positive and negative variations of the altitude value calculated around the true value.

It is also desirable to offer a technique for the georeferencing of remote image acquisitions that, firstly, allows use of the data available to any user and, secondly, achieves a saving in terms of cost and time while also preserving the quality of georeferencing precision. Apart from this, the precision achieved by the method is better than the location accuracy of most of the imaging systems that are operational currently.

SUMMARY OF THE INVENTION

These objects, as well as others that will appear in what follows, are attained by an image processing system including a processor in which the georeferencing of at least one digital image is achieved by means of at least one picture model of the said digital image and of a digital reference relief form, with the said digital image being obtained from a pair of digital images acquired in the same focal plane, characterised in that it includes at least the following stages executed by the processor:
- production of a digital relief form, called an intermediate digital relief form, from the said pair of digital images;
- processing the said intermediate digital relief form and the said reference digital form by calculating the position offsets between the points of the said digital reference relief form and their equivalents in the intermediate digital relief form with a view to refining the said picture model of the said digital image to be georeferenced;
- generating a digital relief form, called the final digital relief form, from the said pair of digital images and from the said refined picture model;
- projecting the said final digital relief form and the said digital image on the ground, in a geographical or cartographic system, for the purpose of their georeferencing.

The two images of the pair are acquired in a small stereoscopic base configuration by sensors located in the same focal plane, and, advantageously, the digital relief forms are digital terrain models.

BRIEF DESCRIPTION OF THE FIGURES

The invention will be better understood, and other advantages will appear more clearly, on reading the description that follows, which is provided by way of a non-limiting example, and with reference to the appended drawings in which.

DETAILED DESCRIPTION OF THE INVENTION

Figure 2:
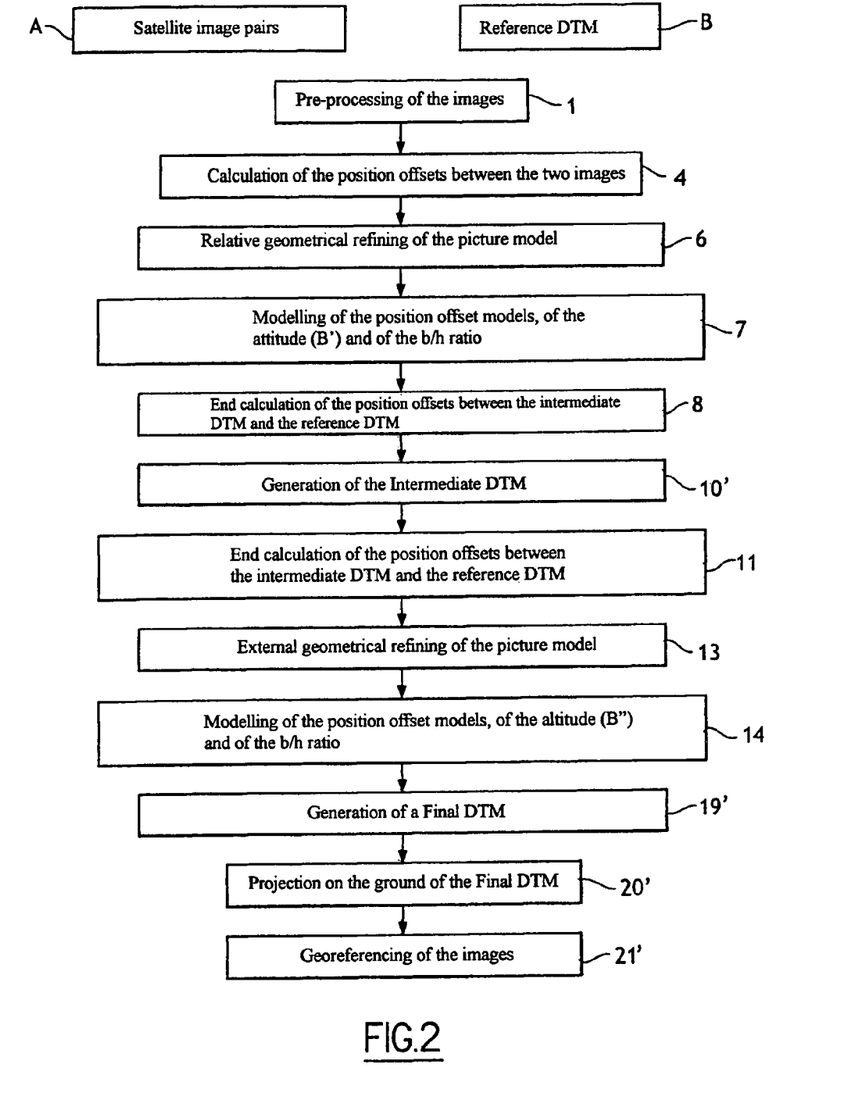
FIG. 2 represents the overall flow diagram of the method according to the invention.

As shown in FIG. 2, the method requires the acquisition of an image pair A. Two CCD elements (or two sets of adjacent CCD elements) or two TDI matrices (or two sets of adjacent TDI matrices) located in the same focal plane are used to acquire the two satellite images of the observed scene at a certain distance from the sensors. The pair acquisition system will be described in detail later.

According to the nature and the characteristics of the images acquired by the sensors, a first pre-processing stage (stage 1) is provided before any processing of the images. This will be described in detail later, with reference to FIG. 3.

More precisely, the method is based on acquisition of the image pair A in a small stereoscopic base configuration, and on the availability of a digital terrain model, referenced B, of the observed scene. The method works even with very small stereoscopic coefficients b/h, but the altimetric precision obtained is inversely proportional to the b/h value. More exactly, the precision in altitude $\Delta h$ will be equal to $\Delta x/(b/h)$, where $\Delta x$ is the precision expected during the offset calculation by correlation, in meters. The two images of the pair A cannot be superimposed as they stand. In fact, the use of the geometrical models associated with the image do not allow us to obtain, with perfect precision, the coordinates of a point in the second image of the pair from its coordinates in the first image. There is an offset between the position estimated by model and the true position. In order to determine this position offset, a comparison is performed between the pixels of the image pair A using a correlation technique. A first image is used as a reference image, and we then seek to find, for each pixel of this image, its equivalent in the secondary image. It is then possible to reconstruct, in three dimensions, the data of the points in the observed scene from the geometrical picture model.

In order to achieve automatic georeferencing of a satellite image of pair A at stage 21', the method makes use of this capability.

In a first stage, it proposes the generation of a digital relief model of the points of the scene, and more particularly the generation of an intermediate DTM of small stereoscopic base (stage 10') from image pair A. This operation 10' for the generation of a model of the DTM type necessitates several consecutive preliminary operations, chief of which are the following:

- comparison of the two images of pair A and, more precisely, a first calculation of position offsets (stage 4) between the two images for a first subset of points in the reference image, which are generally fairly sparse.
- refining of the relative picture model of the image pair (stage 6). This amounts to an operation for internal orientation of a secondary image in relation to the reference image. These definitions associated with the images of the pair are described in detail later with reference in FIG. 3.
- modelling of the position offset, of the altitude, and of the stereoscopic base b/h for a second subset of points, generally dense in this case, of the reference image at stage 7, by means of the refined picture model.
- a second comparison of the two images of pair A, and more precisely, a fine calculation of position offsets (stage 8) between the two images for this second subset of the reference image.
- an intermediate reconstruction of the relief of the observed scene by a calculation of altitude for this second subset of the reference image (stage 10), with these altitudes being determined by referring to the position offsets measured at stage 4 and modelled at stage 9.

In a second stage, the method for the automatic georeferencing of an image of pair A proposes the generation of a final digital terrain model (stage 19') that is superimposable by construction on the reference digital terrain model. With this object, the following are the main stages employed:

- geometrical refining of the external picture model, at stage 13, of the images of pair A, effected by referring to the search for validated points between the intermediate digital terrain model and the reference digital terrain model (B') in the geometry of the reference image.
- modelling, at stage 14, of the offsets, of the altitudes, and of the stereoscopic bases b/h by means of the newly refined picture model.
- final reconstruction of the relief of the observed scene by the calculation of altitudes for a second subset of the reference image (stage 19), with altitudes being determined by referring to the position offsets measured at stage 8 and modelled at stage 14. The final digital terrain model is then projected in a cartographic or geographical system at stage 20'. Georeferencing of the images of pair A at stage 21' is then effected, conventionally, from knowledge of two precise pieces of information, namely the final picture model of the images of pair A and the final digital terrain model in cartographic or geographical ground coordinates.

Figure 3:
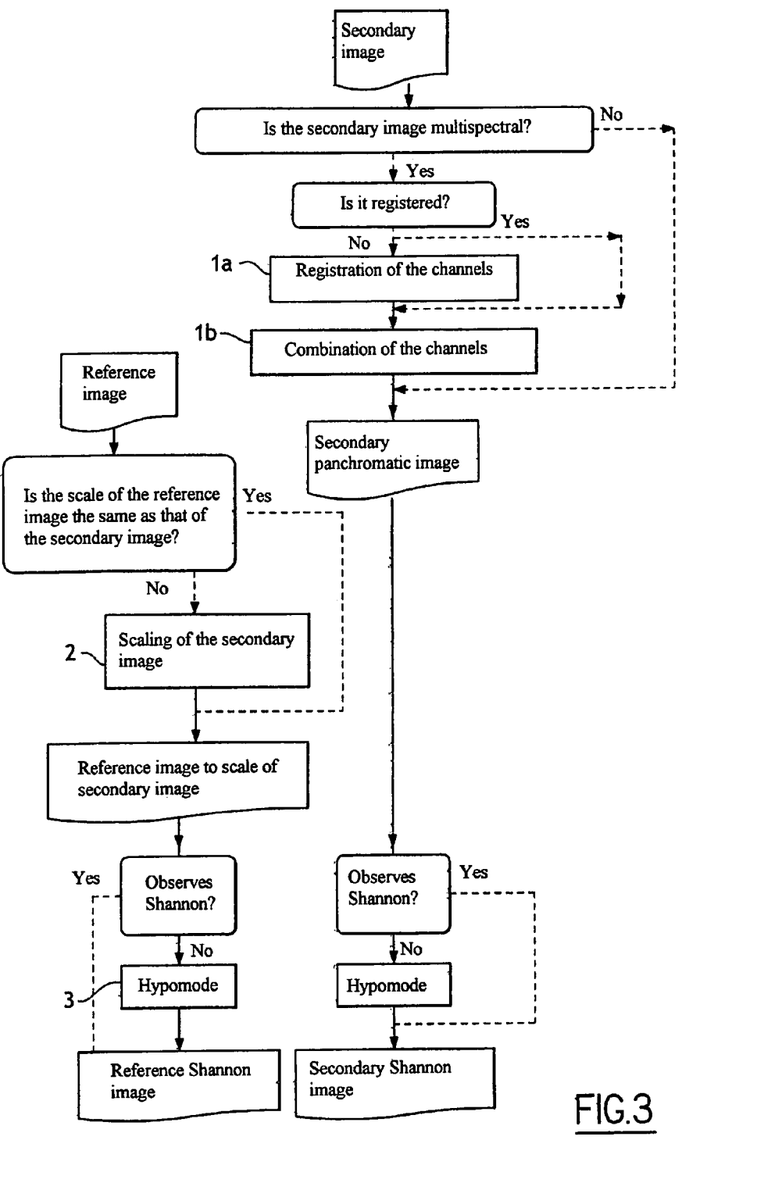
FIG. 3 is a flow diagram of the pre-processing sequences of the image pair acquired by the sensors of the imaging system according to the invention.
Figure 4:
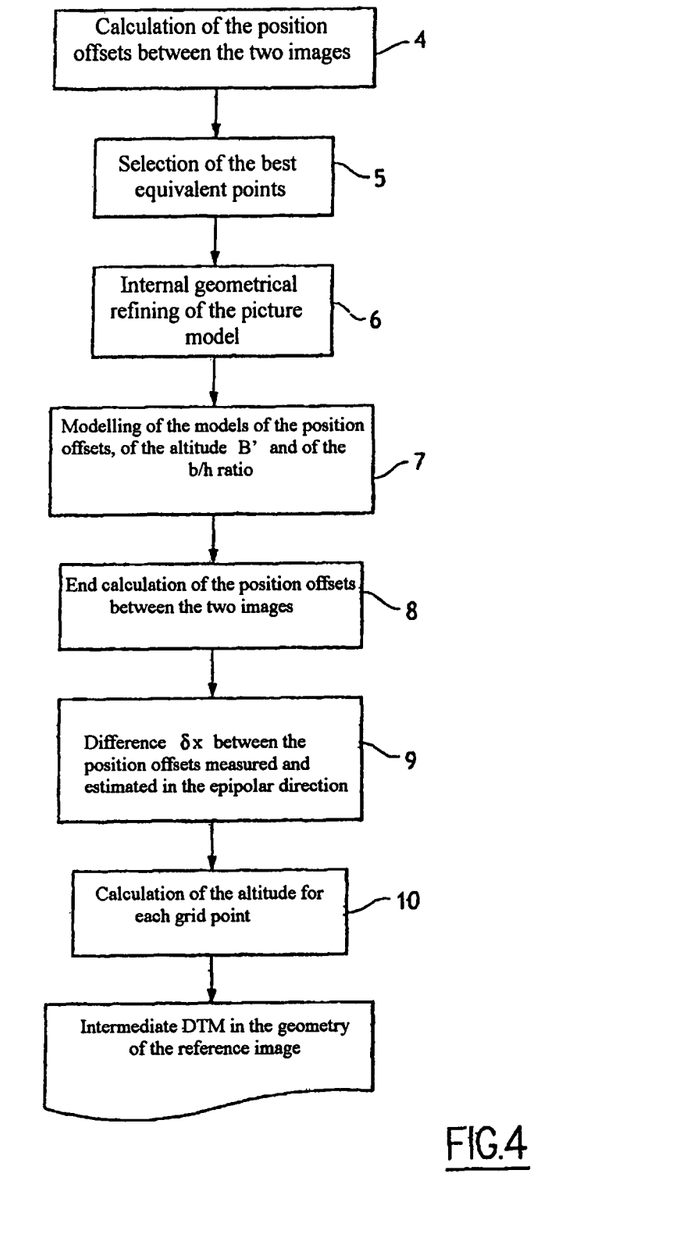
FIG. 4 is a flow diagram of the stages generating an intermediate digital terrain model (DTM) according to the invention.
Figure 6:
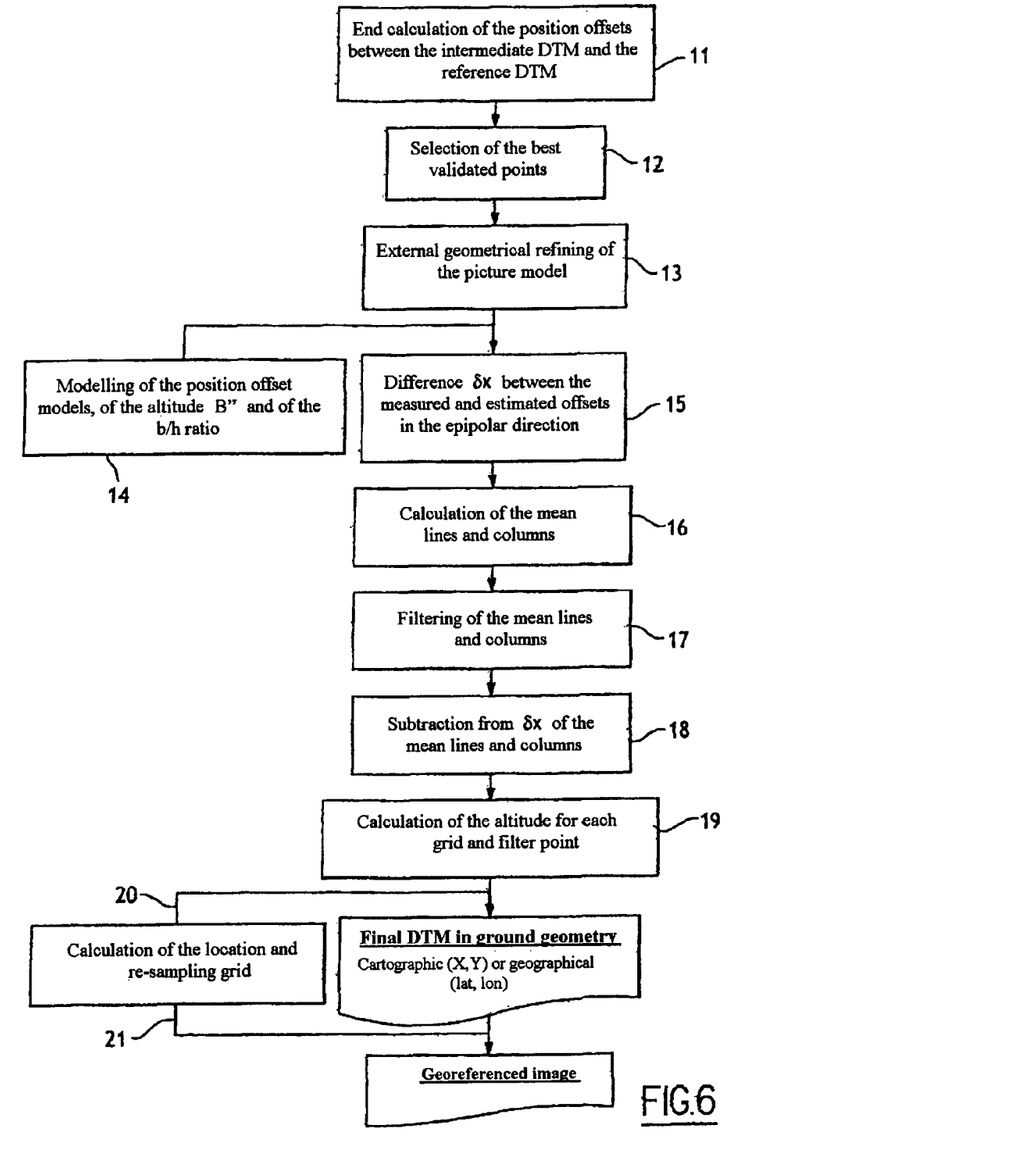
FIG. 6 is a flow diagram of the stages generating the final digital terrain model (DTM) and then georeferencing of the image according to the invention.

FIGS. 3, 4 and 6 which then follow provide further precision regarding the different processing stages of the method executed by a processor according to the invention. These different sequences will now be presented.

1. Input Data

In order to implement the process, the input data are as follows:

- an image pair A, namely a first image and a second image, acquired in the same focal plane and therefore with a small stereoscopic base configuration b/h, typically of a few hundredths of a pixel.

In an illustrative example of the georeferencing process, we define a first image of pair A as a high-resolution panchromatic image, and the second image of pair A as a multispectral image of lower resolution. In this example, the panchromatic spectral band is assumed to be spectrally close to a combination of multispectral bands.

Preferably, we choose the higher-resolution image as the reference image, and the lower-resolution image as the secondary image.

The nature of the images, as well as their characteristics, can be the subject of many implementation variants. These are not limited to the illustrations provided in the description of the preferred method of implementation of the process. In particular, it is possible to envisage the georeferencing of hyperspectral images.

- a reference digital terrain model B. The method imposes no strong constraint concerning altimetric quality or its resolution, but its location must be the best possible since it will be used as a reference location. Secondly, the better its resolution, the better the modelling of the attitude residues that it will be possible to eliminate.

The reference digital terrain model B is projected in the geometry of the reference image by techniques that are very familiar to person skilled in the art. The projection in the focal plane of this DTM, with the original geometrical models, is labelled B'. After refining the related geometrical parameters, it is labelled B".

Preferably, the reference DTM B is the SRTM (Shuttle Radar Topography Mission) DTM, available to any user at site http://seamless.usgs.gov/ at latitudes of between −60° and +60°.

In order to simplify the description of the georeferencing process, in what follows, the processing of the sea and of the clouds will not be considered in the images of pair A. An implementation variant of the method will consist of processing these characteristics by the creation of image masks and by using these to locally invalidate the results of the position offset calculations.

2. Pre-Processing of the Images of Pair A

As illustrated in FIG. 3, the pre-processing, at stage 1, of the image pair A acquired in a small stereoscopic base is effected by executing the following stages:

- registration, that is the placement in the same geometry, of the channels of the multispectral image (stage 1a), if such registration is necessary, and then the combination of these channels (stage 1b) so as to synthesise a spectral band that is close to the panchromatic;
- scaling at stage 2 according to a low-resolution image of the high-resolution image;
- hypomode processing of the image pair A at stage 3.

According in FIG. 3, if the secondary multispectral image is not registered, the registration (stage 1a) must be effected prior to the combination of the spectral channels (stage 1b). We thus convert the secondary image representing luminance image reflectances.

If the secondary multispectral image is registered, it will have the combination of its spectral channels (stage 1b) as initial processing.

In a purely illustrative example, if the reference panchromatic image spectrally covers the equivalent of two multispectral channels, then the combination of the secondary image channels, at stage 1b, is effected by dividing the radiometry of the two spectral channels by their absolute calibration coefficient, and by adding the two channels obtained. We thus generate a secondary panchromatic image.

If the two images do not have the same resolution, then stage 2 is executed to scale the high-resolution image according to the lower-resolution image.

We effect the scaling of the reference high-resolution image according to the secondary image by sampling it by convolution, and by sub-sampling it.

The filtering of the reference image by convolution and by sub-sampling is effected by means of a suitable filter. Preferably, the filter will be representative of the ratio between the low resolution and high resolution modulation transfer functions (MTF). The size of the convolution window will depend on the ratio of the transfer functions of the two images. This operation can be effected with any, even non-integer, resolution ratios.

It is well known from prior art that the spatial resolution is directly linked to the modulation transfer function. The filtering operation does indeed allow the degradation in resolution of the reference high-resolution image of the image pair A.

The Shannon criterion stipulates that any image must be sampled at twice the maximum accessible spatial frequency. If one of the two images of pair A does not observe the Shannon criterion, then an anti-alias treatment is applied to it.

Advantageously, hypomode processing is used (stage 3), but other types of processing can be envisaged. The pixels of the image are summed 2 by 2, in line and in column, without changing the sampling scheme. A new sampling network is thus created. In this way, we reduce the resolution by a factor of 2 in line and in column, but the processed image is now correctly sampled.

The formula used for the calculation is as follows:

$$\left( H_{(i,j)} = 1/4 * \sum_{\substack{k=0,1 \\ l=0,1}} IM_{(i+k, j+l)} \right)$$

H represents the radiometry of the hypomodised image at the pixel with coordinates (i,j), and IM that in the image before processing, with summation of the pixels at coordinates (i,j) and (k,l).

This type of processing modifies the geometrical conditions of the image by offsetting it by 0.5 pixels in line and in column. We then associate with this operation a translation of −0.5 pixels in line and in column, in order to return exactly to the original geometrical conditions. The end of stage 1 of image pre-processing is characterised by the acquisition of an image pair at the same scale, thus verifying the Shannon criterion.

We then carry out the processing proper of the images of pair A. The method generating the georeferenced images includes the different stages mentioned previously, and which will now be described in detail with reference in FIGS. 4 and 6.

3. Relative Geometrical Refining of the Picture Model

As illustrated in FIG. 4, we are seeking, in a first stage, to perform relative geometrical refining of the picture model, and more precisely the internal orientation of the secondary image in relation to the reference image.

It should be remembered that it is necessary to refine the picture model, since the knowledge of parameters like the dating of the lines, the position and the speed of the satellite (nautical almanac), the orientation of the satellite (attitude) and the directions of view of the detectors in relation to the satellite (characterisation of the focal plane) is not perfect, therefore does not allow us to exactly determine the correspondence of the coordinates of the pixels of the images of pair A with coordinates on the ground.

This refining allows us to identify the relative differences between the picture models and the temporal changes in the attitude of the carrier.

Advantageously, we consider that the dating of the lines and the nautical almanac are correct. In fact, the precision of these parameters is better than one meter.

Refining concerns the attitude parameters that influence the relative orientation of the images, that is the temporal drift in attitude and the relative internal orientation of the sensors. In the event that the internal orientation of the sensors is known perfectly, the object then becomes to reduce or eliminate the drifts for each of the 3 sets of angle, roll, pitch and yaw, and to adjust the focal distance of the secondary image in relation to the reference image.

In one implementation variant of the process, concerning a system in which the nautical almanac or the dating of the lines may be lacking in precision, it would also be necessary to refine these using techniques that are known to person skilled in the art. Refining of the geometrical picture model is effected by means of the following stages:

calculation of the position offsets between the two satellite images of pair A at stage 4;

selection of the best validated points of the two images of pair A at stage 5;

geometrical refining proper of the internal picture model of the secondary image at stage 6, by means of the validated points selected at stage 5.

Stage 4, for calculating the position offsets between the two images of the pair, necessitates identification of the pixels that will be considered as equivalent in the two images.

This comparison between pixels of the two images is possible only by means of the recognition of a radiometric similarity in the neighbourhood of these pixels. By considering a rectangular or square shape, a neighbourhood centred on a pixel (i,j) is characterised by a thumbnail.

Measuring the resemblance between a pixel of the reference image and a pixel of the secondary image therefore amounts to assessing the resemblance of two thumbnails. Preferably, a correlation technique is chosen in order to determine the degree of resemblance between the thumbnails, namely the thumbnails of the reference image and the thumbnails of the secondary image.

More precisely, the measurements of resemblance are similar to covariance calculations. The correlation coefficient chosen is defined as the normalised covariance between two thumbnails, and its formula is as follows:

$$Coef = \frac{E(\text{rad1}(i,j) \cdot \text{rad2}(l,p))}{\sigma_1 \cdot \sigma_2}$$

The expression rad(i,j) defines the radiometry (line, column) equal to (i,j) in the reference thumbnail, rad(l,p) defines the radiometry of the pixel with coordinates (line, column) equal to (l,p) in the secondary thumbnail, and the denominator is expressed as the product of the standard deviations of thumbnails 1 and 2. E represents the mathematical expectation.

Advantageously, the calculations of correlation coefficients are performed on a loose correlation points grid representing a regular subset of pixels in the reference image. The pitch of the correlation grid is chosen so as to be significantly greater than the number of unknowns to be determined during the refining process. It is preferable to employ a regular seeding on a grid of about 30*30. The automatic correlation technique will allow determination of the validated points between the two images is applied firstly by the introduction of thumbnails known as correlation thumbnails. These thumbnails are sub-images of the reference and secondary images, centred on the pixels assessed as being equivalent. These equivalent pixels are assessed by virtue of our knowledge of the initial picture model and of the reference digital terrain model B.

The principle of offset calculation by correlation is shown for one particular point of the loose correlation grid of the reference image, but it is effected for each of the points in the grid. We take a thumbnail centred on a point of the grid of the reference image, and we look for its radiometric equivalent in the secondary image. This operation is performed by moving the correlation thumbnail of the secondary image in a larger window denoted the search area. Both of these are initially centred on the assessed equivalent pixel of the point of the grid of the reference image, and the correlation coefficient is calculated at each movement of the correlation thumbnail in the search area. On the basis of the values of the calculated correlation coefficients, the pixel of the secondary image that represents the centre of the correlation thumbnail in the search area producing the highest correlation coefficient is identified as the point that is equivalent to the point on the correlation grid of the reference image. From this position, and with different possible strategies like the ½" pitch dichotomy, or a search in the direction of the maximum gradient of the correlation rates, the same calculation is carried out at the sub-pixel level by locally re-sampling the secondary image at fractional positions in terms of line and column, until the fractional position is found that maximises the correlation coefficient.

Advantageously, we then apply a cardinal sine filter, with dimensions of 15*15 points, apodised by a normalised gaussian, on the correlation thumbnail of the secondary image. In fact it is necessary to use an interpolating filter that is as close as possible to the theoretically ideal filter, namely the cardinal sine filter, which is infinite. Other filters are also usable, such as those based on the spline functions. The secondary image is re-sampled around the position of the equivalent identified during the preceding sub-stage, to + or –0.5 pixels in line and column. Then in an iterative manner, with offsets that are smaller each time (½") around the best position, the correlation coefficient is re-calculated for each of the positions, and the correlation maximum is identified.

The size of the thumbnails is the result of a compromise. A large thumbnail increases the statistical significance of the correlation coefficient, but reduces the geometrical resolution of the process. The size of the correlation thumbnails is preferably 13*13 points, and the size of the search area is a function of the estimated maximum error in the relative orientation of the two images.

However, the size and the shape of the correlation thumbnails, as well as the nature of the resemblance coefficients employed to identify the validated points, can be the subject of many implementation variants. Having identified the pairs of validated points of the two images in pair A, the position offsets in line and column for each pair of validated points are deduced from their pixel coordinates at stage 4.

We then select the best validated points at stage 5 according to the value of the correlation criterion, the shape of the correlation peak and the distribution of the validated points on the secondary image. The first two aspects are well known to person skilled in the art and will therefore not be described in further detail. Regarding the distribution of the points, we ensure, for example, that there are at least 10 pairs of validated points for each image zone, with the image being divided typically into 4*4 adjacent zones of the same size.

The search techniques for validated points and for calculation of the position offsets between matched pairs of points can be the subject of many implementation variants, must not be limited to the illustration provided in FIG. 4 of the georeferencing process.

It is now possible to proceed to internal geometrical refining of the picture model (stage 6) of the images, and we are seeking more particularly to refine the parameters of attitude acquisition between the two images of pair A. We consider that the values of these parameters to be refined are close to the initially known values, and we linearise around these initial conditions.

By making use of the selected pairs of validated points, we effect the refining by minimisation of the differences between the measured points and the points estimated by the refining operation, using the method of least squares—a technique that is well known to person skilled in the art.

In the context of any imaging system using the process, the refining procedure can be the subject of several implementation variants, and is not limited to the illustration provided for reference in FIG. 4.

4. Generation of the Intermediate DTM

As illustrated in FIG. 4, we are now seeking to generate an intermediate digital terrain model in conditions using a small stereoscopic base. The generation of this altitude model is effected mainly by means of the following stages, in a dense correlation points grid in the reference image:

modelling of the position offset, of the estimated altitude (B') and of the stereoscopic base (b/h) for all the points of the grid (stage 7), by using the newly refined picture model and the reference DTM B. In order to determine the altitude grid (B'), we project the reference DTM B in the geometry of the reference image and we obtain a reference digital model (B');

comparison of the two images of pair A at stage 8, and more precisely, end calculation of position offsets between the two images.

intermediate reconstruction of the relief of the observed scene by a calculation of altitude (stage 10) for each point in the correlation grid.

The pitch of the grid is preferably determined between N/3 and N/2, where N is the size of the thumbnail centred on a pixel of the reference image in one direction. In fact, the offset measurement is averaged over the thumbnail. In order to sample this signal correctly, it is only necessary to take a grid pitch of less than N/2. This also has the advantage of limiting the number of points to be calculated.

The effect of the modelling is to accelerate the end calculation of the offsets at stage 8, since the search area for the correlation thumbnail centred on an equivalent point in the secondary image becomes smaller as the estimate of its position improves.

Stage 8, for end calculation of the position offsets between the reference image and the secondary image, includes the following sub-stages:

a search for the positions of the equivalents of the points on the grid of the reference image in the secondary image by automatic linear correlation. The correlation principle is similar to that of stage 4, but the search area can be smaller, since the relative geometry between the two pictures is now well known. In order to initialise the calculations, we position the correlation thumbnail centred on the point of the secondary image that has been estimated as equivalent to the point in the reference image processed, in modelling stage 7. We then look for and identify the true equivalent point by determining the position, in the search area, of the centre of the correlation thumbnail that maximises the correlation coefficient.

for a search with a sub-pixel precision for the position of the secondary thumbnail that gives the maximum value of the correlation coefficient, we interpolate the secondary image around values that are chosen in the same way as at stage 4. Advantageously, we apply a cardinal sine filter, with dimensions of 15*15 points, apodised by a normalised gaussian, to the correlation thumbnail of the secondary image. Other filters are also usable, such as the types based on the spline functions. The secondary image is re-sampled around the position of the equivalent identified during the preceding sub-stage, to + or −0.5 pixels in terms of line and column. Then, in an iterative manner, with offsets that are smaller each time ($\frac{1}{2}^n$) around the best position, the correlation coefficient is re-calculated for each of the positions and the correlation maximum is identified. Other strategies are also possible, such as those based on local gradients of the correlation rate. Typically, the correlation rates are greater than 0.97, and the location accuracy of the validated points attained is 0.01 to 0.03 pixels for the images with a resolution of 10 meters, and with a signal/noise ratio of 200 for a mean luminance of 120 W/nr/steradian, and after having brought the images within the conditions of the Shannon criterion.

It is thus possible to make a position offset value correspond to any pixel of the reference image, on condition that the equivalent pixel is found. At the output of this stage, we get a dense and precise grid of position offsets between the pixels of the reference image and their equivalents in the secondary image.

The intermediate reconstruction of the relief of the scene created at stage 10 for the calculation of altitude at each point of the dense correlation grid of the reference image is initialised at stage 9 by calculation, in the epipolar direction, that is the direction of the stereoscopic parallax, of the difference ($\Delta x$) between the position offsets determined during stage 8, and the offset model established at modelling stage 7.

As a first approximation, this difference ($\Delta x$) is proportional to the difference between the true altitude of each point on the grid and the altitude estimated at stage 7. In fact we define the altitude value of each of the points by means of the following formula:

$$\text{Altitude} = \text{altitude modelled in DTM } B' + [\Delta x/(\text{local } b/h)]$$

Using B', which represents the reference DTM B placed in the geometry of the reference image on the dense correlation grid and of the model of the local stereoscopic base values (b/h) (stage 7), we are thus able to create the relief of each point of the grid in the reference image. We are therefore able to generate an intermediate digital terrain model with a small stereoscopic base in the geometry of the reference image. The sub-pixel precision attained during the correlation method enables us to achieve very good altimetric accuracy despite the small stereoscopic effect.

Figure 5:
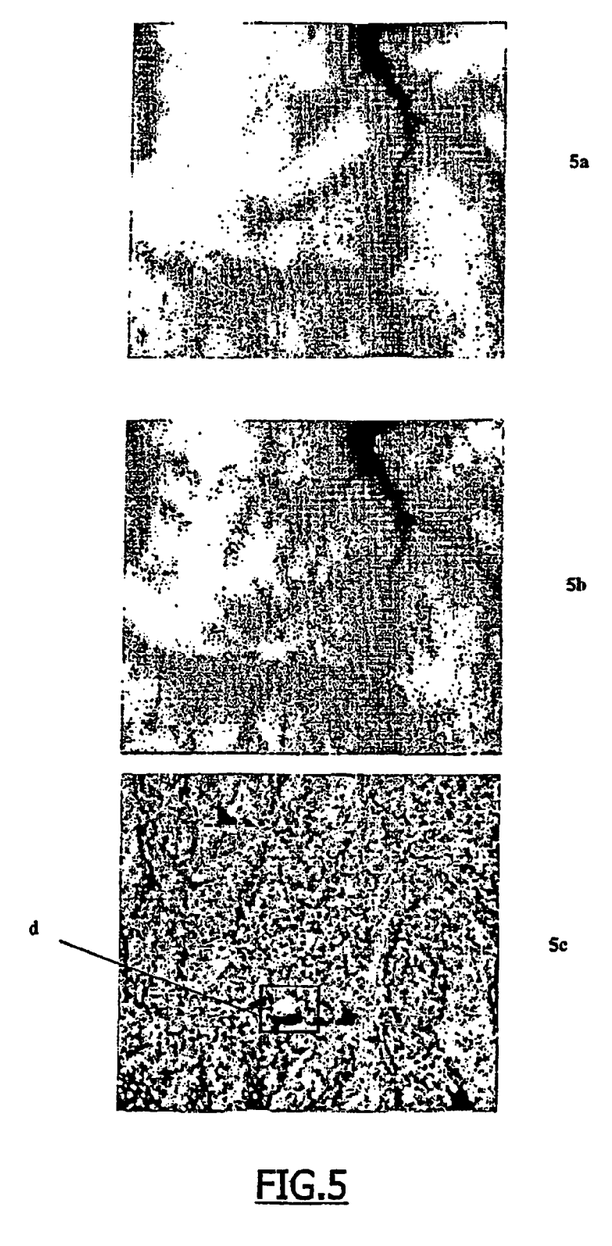
FIG. 5 (5a, 5b, 5c) illustrates three digital terrain models, namely an intermediate DTM, a reference DTM, and the difference between the above two DTMs.

FIGS. 5a, 5b and 5c respectively illustrate an example of an intermediate DTM with a small stereoscopic base generated by the process, the reference DTM (B'), and the difference between the two preceding models, all three being in the focal plane of the instrument.

The zones with large differences are the zones in which the reference digital terrain model had no value, that is those that involve masked parts that are due, for example, to an excessively high relief. The presence of marks such as those in window d is the sign of a zone in which the reference DTM was unknown, and therefore has to be interpolated. The presence of low-frequency shapes that are visibly correlated to the relief is a sign that the two DTMs, namely the intermediate DTM and the reference DTM, are still not perfectly superimposable.

The processing stages that follow will be able to remedy this state of affairs.

5. External Geometrical Refining of the Picture Model

As illustrated in FIG. 6 and as presented previously with reference to FIG. 2, we now seek to perform a second geometrical refining of the picture model (stage 13), and more precisely an operation for external orientation of the images of pair A, typically by eliminating the biases in roll, pitch and yaw.

Refining of the geometrical picture model is effected by means of the following stages:

end calculation of the position offsets between the two DTMs, namely the intermediate DTM and the reference DTM (B'), at stage 11;

selection of the best validated points between the two DTMs, at stage 12;

external geometrical refining proper of the picture model of the reference image, at stage 13.

The method of end calculation of the position offsets, at stage 11, between the two digital terrain models, is the result, like that of the images, of a search for the position of validated points that maximises the local correlation between the two DTMs.

This end calculation of the position offsets is effected by using the intermediate DTM and the reference DTM (B') brought into the geometry of the reference image, and it includes the following sub-stages.

For each of the points of a correlation grid defined as a subset of the reference DTM (B') typically with a grid pitch of 5:

a search for the positions of the validated points at the points of the reference DTM (B') in the intermediate DTM by linear correlation. The principle of searching for validated points is identical to that of stage 4, and the characteristics of the thumbnails are similar to those of stage 4. The search area can be small, and depends of the location accuracy of the imaging system. For a location accuracy of 100 meters, for example, an intermediate DTM generated every 50 meters, and a reference DTM assumed to be perfectly located, a search area of 2 DTM pixels is adequate. To initialise the calculations, the correlation thumbnail is positioned on the secondary image at the same place as in the reference DTM (B'). We then seek to identify the equivalent point by determining the position, in the search area, of the centre of the correlation thumbnail that maximises the correlation coefficient.

the sub-pixel calculation is performed in the same manner as in stage 4.

At the output of stage 11, for each point of the grid on the reference DTM (B'), we obtain the offset, in terms of line and column, between the validated points of the two DTMs.

We then select the best pairs of validated points at stage 12 in accordance with two criteria, namely choosing the pairs of validated points preferably on a large relief and with a high correlation rate.

The points of the reference DTM that are selected in the pairs are considered to be control or anchor points since, by definition, we have precise knowledge of their position on the ground.

The search techniques for validated points and for calculation of the position offsets between two digital terrain models can be the subject of many implementation variants, and must not be limited to the description given of the method with reference to FIG. 6.

Stage 13, for external geometrical refining of the picture model of the reference image is effected using the method of minimisation by least squares, and is typically performed for the purpose of correcting the biases in roll, yaw and pitch, by assuming that the focal plane of the reference image is known perfectly.

At the output of this stage, we obtain a final refined picture model for the reference image as well as for the secondary image, on condition, for the latter, that we copy the values of the biases in the picture model of the reference image to the picture model of the secondary image.

At this processing level of the process, we therefore have refined geometrical parameters for the two images of pair A.

It is recommended that one should end with an overall refining of all the parameters (not illustrated in FIG. 6), including refining of the bias in pitch, roll and yaw for the model of the primary image, shared refining of the drift in roll, pitch, yaw for the two images, and refining of the internal picture angles between the two elements, since the two refining procedures performed by the method are not strictly independent.

6. Generation of a Final DTM

As illustrated in FIG. 6, we now seek to generate a final digital terrain model in the focal plane. Generation of this altitude model is effected mainly by means of the following stages:

modelling of the position offsets, of the altitude (B") and of the values of the stereoscopic base (b/h) on the points of the dense grid (stage 14) by using the refined final picture model and the reference DTM. In order to determine the altitude grid (B"), the reference DTM B is projected in the geometry of the reference image, and we obtain a reference digital model (B");

obtaining the difference between the position offsets, measured at stage 8 and modelled at stage 14, of the two images of pair A (stage 15);

filtering of the mean lines and columns of the dense points grid (stage 17);

final reconstruction of the relief of the observed scene by calculating the altitudes of each point of the grid (stage 19) and optional filtering.

By means of this final model of the position offsets, and knowing the dense grid of the offsets measurements, at stage 8, between the reference image and the secondary image, then at stage 15 we calculate the difference ($\Delta x$) between the measured and estimated offsets in the epipolar direction for the pairs of validated points of the two images. These come from three sources:

the offsets due to unmodelled attitude residues of the sensor or to an imperfect knowledge of the focal plane;

the offsets due to the lack of precision in the altitudes of the reference DTM. In fact these differences are directly interpretable in the form altitude errors in the reference DTM;

The measurement noise.

In order to correct the potentially large altimetric errors due to unmodelled residues of the picture geometry, that is to eliminate the residual effects in terms of both column (attitude residues) and line (residues of the focal plane), which degrade performance because of the small stereoscopic base, we do the following:

calculation of the mean line and column of the position offsets on the grid (stage 16), taking care to do the calculation only on the valid points, that is those for which correlation was valid and in which the reference DTM was valid;

calculation of the mean lines and columns by means of a low-pass filter (stage 17) that selects the spatial frequencies that are lower than the maximum spatial frequency accessible by the reference DTM. The filter can be built either in the space or frequency domain, and care is taken to regularise its frequency response in order to prevent bounce phenomena. Filtering is a technique that is well within the scope of person skilled in the art. At this stage, we obtain, as the mean line, the low-frequency residue of the modelling error of the focal plane, and as the mean column, the low-frequency residue of the modelling error of the carrier attitude.

subtraction of the difference ($\Delta X$), from the mean lines and columns (stage 18), and calculation, using the formula defined with reference to FIG. 4 and at stage 10 for generation of the intermediate MIMT, of the altitude of each point in the dense correlation grid (stage 19) using the final model grids of altitude (B") and stereoscopic base.

It is finally also possible to individually filter the points of the correlation grid in the zones in which the reference DTM B was considered to be valid (not the hidden zones) as a function of the local gradient of this DTM. The greater the gradient, corresponding to high relief, the more this allows a large difference between the reference DTM (B") and the calculated final DTM. Advantageously, we retain only the points for which the absolute value of the difference from the model does not exceed 3 times the absolute value of the local gradient. At the output of stage 19, we thus obtain a final digital terrain model in the geometry of the reference image, consolidated and with a location quality that is equal to that of the reference DTM, an absence of distortion, and a high degree of precision especially in high relief.

7. Georeferencing of the Satellite Images

The final digital terrain model, calculated in the focal plane, is projected in ground coordinates at stage 20, in a geographical system or a cartographic system, using a technique that is well-known to person skilled in the art, consisting of calculating the reverse location grid using the refined final picture model of the reference image and the reference DTM, followed by re-sampling. The product is a final DTM (C), located exactly as the reference DTM B.

By now making use of the refined final picture model of the image that we are seeking to georeference, and the final DTM (C) that has just been produced, we automatically sample either the images of pair A over all of the cartographic system, or the geographical system in the same way as at stage 20. In fact, since the refined picture parameters of the image are available, then all the points of the image can be projected in a precise manner in the cartographic or geographical geometry by our knowledge of the DTM (C).

8. The Output Data

The method enables us to obtain the following data, if we place ourselves in the frequent case in satellite imagery of a pair A composed of a high-resolution panchromatic image and a low resolution multispectral image. This is the reference georeferenced panchromatic image, the secondary georeferenced multispectral image, and the georeferenced merged image (the multispectral high-resolution image), since the latter is perfectly superimposable by construction onto the reference panchromatic image. These examples of products generated by the method are non-limiting examples of the capabilities of the process. One possible variant of the products generated by the method would be two georeferenced hyperspectral images, obviously on condition that the input data is a hyperspectral image pair. Another variant could be composed of two images in the same spectral band and with the same resolution, allowing the creation of a finer DTM.

Figure 7:
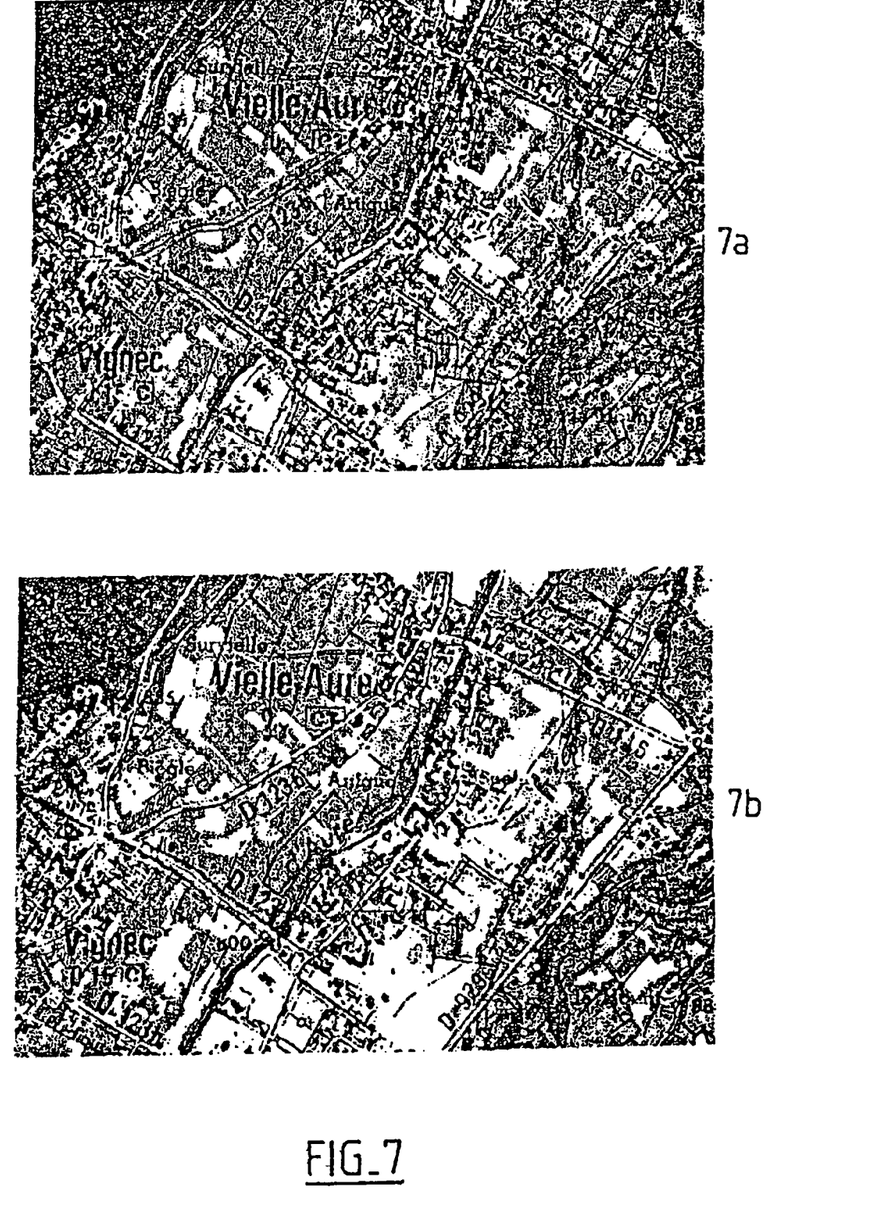
FIGS. 7a and 7b show an extract from a SPOT 5 image that has been georeferenced by the original location of the SPOT 5 satellite, superimposed onto a map by transparency, and the same extract georeferenced by the method according to the invention.

Artificial images manufactured from a Spot 5 image with a resolution of 2.5 meters, and a superimposed IGN Scan25 map, are shown in the pictures of FIG. 7. Firstly, in FIG. 7a the Spot 5 image has been georeferenced with the picture model and the original location of Spot 5, accurate to within about 30 meters, and secondly, in FIG. 7b, the Spot 5 image has been georeferenced using the automatic georeferencing method of the invention. An image/map transparency process, with 80% image and 20% map, enables us to assess the superimposition of the geo-encoded image on the map of the IGN (national geographical institute).

It can be seen here that the quality of superimposition depends on the location of the reference DTM and on the quality of the final DTM generated by the process. In the case of FIG. 7, the reference DTM, which is an SRTM DTM, is visibly very well located.

9. The System for Acquisition of the Image Pair

The method described above is suitable for implementation in an assembly that includes a system for the processing of, and a system for the acquisition of, remote images.

The acquisition system allows acquisition of the input data of the process, which are the two images of image pair A, namely the reference image and the secondary image.

In the preferred method of implementation of the invention, this acquisition system will be illustrated by a satellite, but any imaging system can be illustrated by the system for acquisition of the input data employed by the process. This acquisition system includes a unique acquisition instrument that is used to collect, virtually simultaneously in a single passage, virtually in real time, image pairs with a small stereoscopic base by observing the scene from two fairly close angles. These image pairs will be used for the creation of digital terrain models with a small stereoscopic base over large areas.

The acquisition instrument is composed of a unique optical system and several sensors located in the same focal plane.

The images of pair A are formed in the focal plane of the lens, on the sensors.

Each sensor is of the CCD element or TDI matrix type. It is defined by its internal geometry. Each of the sensors can be composed, as appropriate, of several CCD detectors or TDI matrices that are juxtaposed. Each detector captures the light emitted by a ground pixel.

The placement of the sensors within the same focal plane gives rise to small values of the b/h ratio, typically of 0.01 or 0.02. In fact, for an instrument with a focal distance f, the distance between the sensors is f*(b/h). For a focal distance of about 1 meter and a distance between the two sensors of the order of one centimeter, we then obtain values of b/h of the order of one hundredth. The distance between the directions of view in this case is of the order of one degree. The principle for acquisition of the pair of satellite images A by means of the acquisition system is that each line is formed by the response of the landscape sensors, and the columns are formed by the progression of the satellite.

For each of the sensors, at each instant t, only the ground points located in the plane defined by the optical centre of the optical system and the straight line containing the CCD element or the TDI matrix are seen by the system. This plane is described as a viewing plane.

The radiation received during certain period, dt, and arising from the ground points contained in the viewing plane is recorded. Since the satellite is in motion, then at the next instant, t', another part of the space is observed, and so on. Thus, at regular time intervals, the system records a line of pixels. The resulting set of recordings constitutes one of the images of pair A, and this can then be georeferenced using the method described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for processing images in which the georeferencing of at least one digital image is performed by means of at least one picture model of said digital image and of a reference digital terrain model said digital image being obtained from a pair of digital images acquired in the same focal plane, said method comprising at least the following stages:

stage of determining an intermediate digital terrain model from said pair of digital images, said stage of determining including at least a sub-stage that calculates, by correlaton, position shifts between the two digital images of said pair;

stage of processing said intermediate digital terrain model and said reference digital terrain model by calculating, by correlation, position shifts between said reference digital terrain model and said intermediate digital terrain model to refine said picture geometry model of said digital image to be georeferenced to obtain a refined picture geometry model;

stage of generating a final digital terrain model, from said pair of digital images and said refined picture geometry model, said stage of generating including:

a sub-stage that calculates a model of position shifts between the two digital images of said pair from said refined picture geometry model and calculates differences between said model of position shifts and said calculated position shifts between the two digital images of said pair; and projecting said final digital terrain model and said digital image on the ground, in a geographical or cartographic system, for the purpose of georeferencing them.

2. The method according to claim 1, wherein the digital images of said pair are acquired with a small stereoscopic base.

3. The method according to claim 1, wherein said stage of determining the intermediate digital terrain model includes the following sub-stages:

creating a first model of the estimated position shifts between the two digital images of said pair;

calculating the difference between said position shifts between the two digital images of said pair and said first model of the position shifts; and calculating the altitude of the points of the digital images of said pair.

4. The method according to claim 1, further comprising a pre-processing stage that includes at least the implementation of anti-alias processing of said pair of digital images so that they both verify the Shannon criterion.

5. The method according to claim 1, wherein, in addition, said stage of generation of a final digital terrain model includes at least the following sub-stages:

creation of a second model of the estimated position shifts between the two digital images of said pair;

calculation of the difference between said position shifts between the two digital images of said pair and said second model of the position shifts;

filtration of the mean lines and columns of the digital images of said pair; and calculation of the altitude of the points of the digital images of said pair.

6. The method according to claims 1, 2 or 3, wherein said pair of digital images is composed of two images with at least one of different spectral bandwidths or different resolutions.

7. The method according to claim 1 further comprising the step of using an acquisition system for a pair of images in the same focal plane, including at least two optical sensors, where the first sensor is used for acquisition of the first image of said pair, and the second sensor is used for acquisition of the second image of said pair, the two sensors being positioned in a small stereoscopic base configuration.

8. The method according to claim 7 wherein the acquisition system includes CCD elements or TDI matrices as optical sensors.

9. The method according to claim 1 further comprising the step of using acquisition system for a pair of images in the same focal plane, for the purpose of georeferencing at least one image of said pair including at least two optical sensors, where the first sensor is used for acquisition of the first image of said pair and the second sensor is used for acquisition of the second image of said pair, with the two sensors being positioned in a small stereoscopic base configuration.

10. An image processing system in which the georeferencing of at least one digital image is performed by means of at least one picture model of said digital image and of a reference digital terrain model, with said digital image being obtained from a pair of digital images acquired in the same focal plane, said system comprising a processor to:

determine an intermediate digital terrain model, from said pair of digital images, and calculate, by correlation, position shifts between the two digital images of said pair;

processing means to process said intermediate digital terrain model and said reference digital terrain model by calculating, by correlation, position shifts between said reference digital terrain model and said intermediate digital terrain model to refine said picture geometry model of the digital image to be georeferenced to obtain a refined picture geometry model;

generation means to generate a final digital terrain model, from said pair of digital images and said refined picture geometry model, by calculating a model of position shifts between the two digital images of said pair from said refined picture geometry model and calculating differences between said model of position shifts and said calculated position shifts between the two digital images of said pair; and projection means to project said final digital terrain model and said digital image on the ground, in a geographical or cartographic system, for the purpose of their georeferencing.

11. The system according to claim 10, wherein the images of said pair are acquired in a small stereoscopic base.

12. The system according to claim 10, wherein the processor is to:

modelling means to create a first model of the position shifts between the two digital images of said pair;

primary calculation means to calculate the difference between said position offsets between the two digital images said pair and said first model of the position shifts; and secondary calculation means determine the altitude of the points of the digital images of said pair.

13. The system according to claim 10, wherein the process is to perform anti-alias processing of said pair of digital images so that they both verify the Shannon criterion.

14. The system according to claim 10, wherein, the processor is to:

modelling means to create a second model of the position shifts between the two digital images of said pair;

primary calculation means to calculate the difference between said position shifts between the two digital images of said pair and said second model of the position shifts;

filtering means to filter mean lines and columns of the digital images of said pair; and secondary calculation means determine the altitude of the points of the digital images of said pair.

15. The system according to claims 10,11 or 12, wherein said pair of digital images is composed of two images with at least one of different spectral bandwidths or different resolutions.

* * * * *

UNITED STATES PATENT AND TRADEMARK OFFICE
CERTIFICATE OF CORRECTION

PATENT NO. : 8,879,871 B2
APPLICATION NO. : 11/793480
DATED : November 4, 2014
INVENTOR(S) : Vadon Page 1 of 1

It is certified that error appears in the above-identified patent and that said Letters Patent is hereby corrected as shown below:

In the claims

Column 16, line 17, Claim 1 after "picture" insert --geometry--.
Column 17, line 31, Claim 10 after "picture" insert --geometry--.

Signed and Sealed this
Twenty-third Day of February, 2016

Michelle K. Lee
*Director of the United States Patent and Trademark Office*